(No Model.) 4 Sheets—Sheet 4.
W. B. BLAND.
COW MILKING MACHINE.
No. 526,215. Patented Sept. 18, 1894.
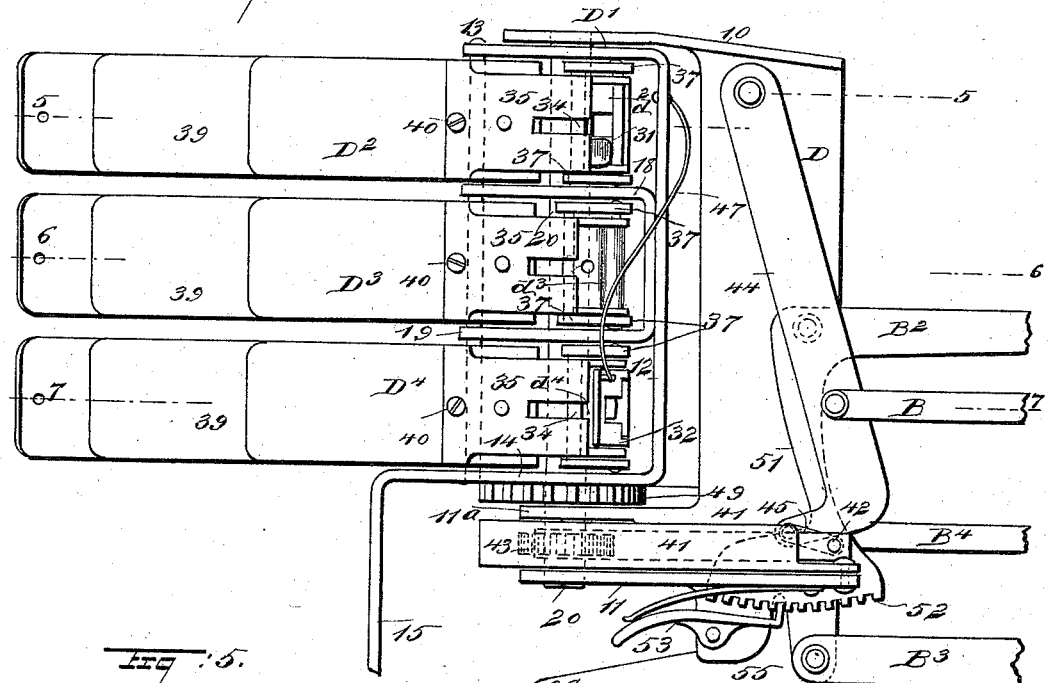
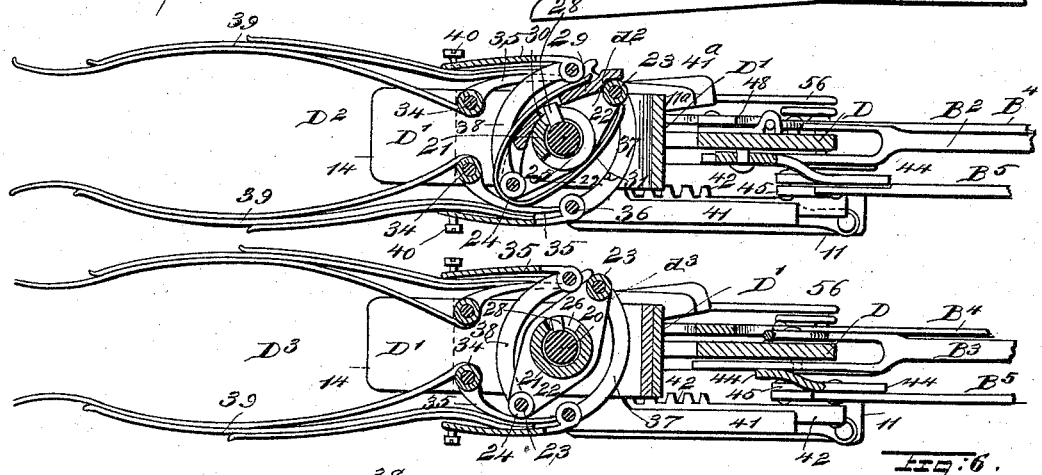
WITNESSES
H. Walker
C. Sedgwick
INVENTOR
W. B. Bland
BY Munn & Co
ATTORNEYS.

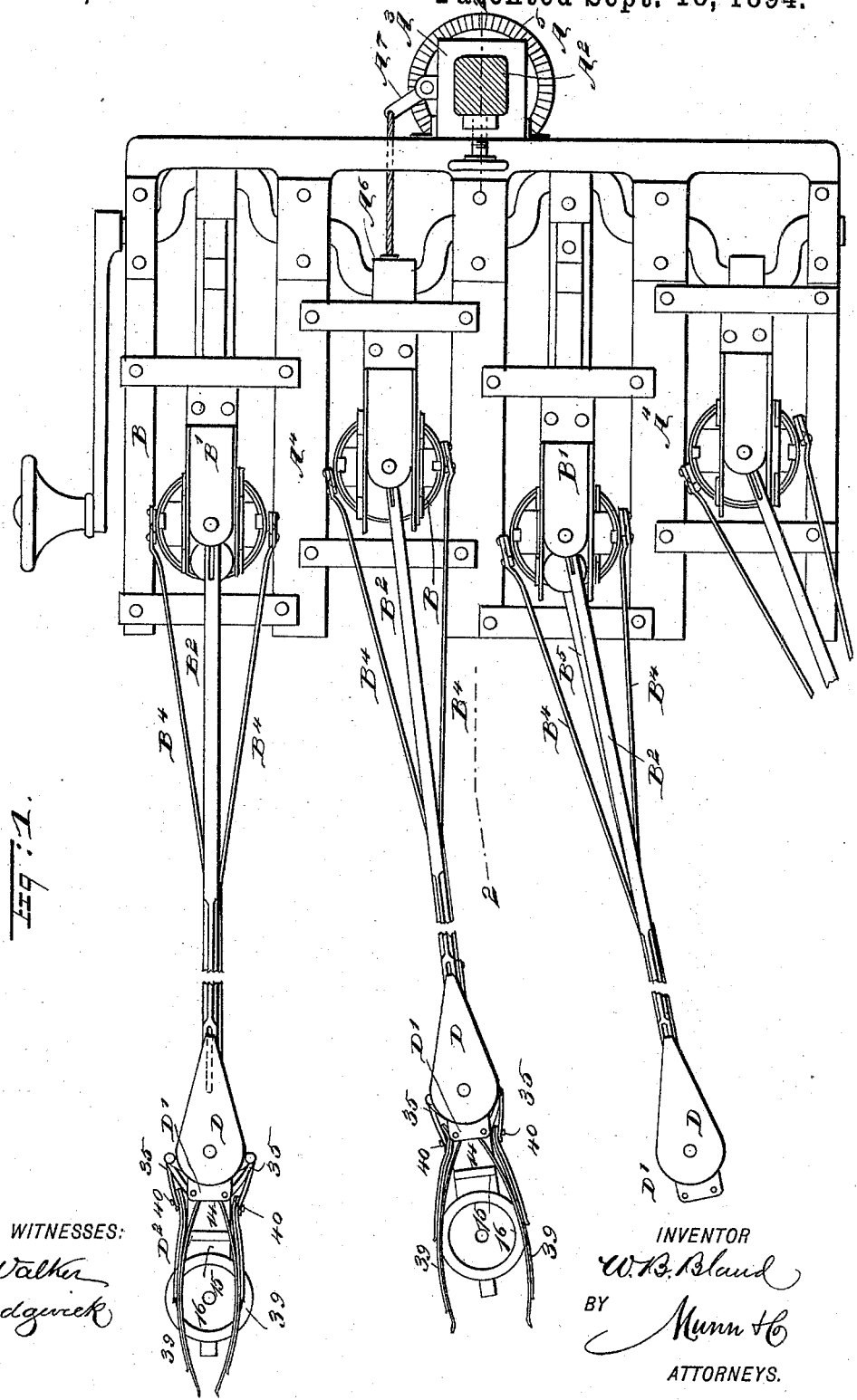

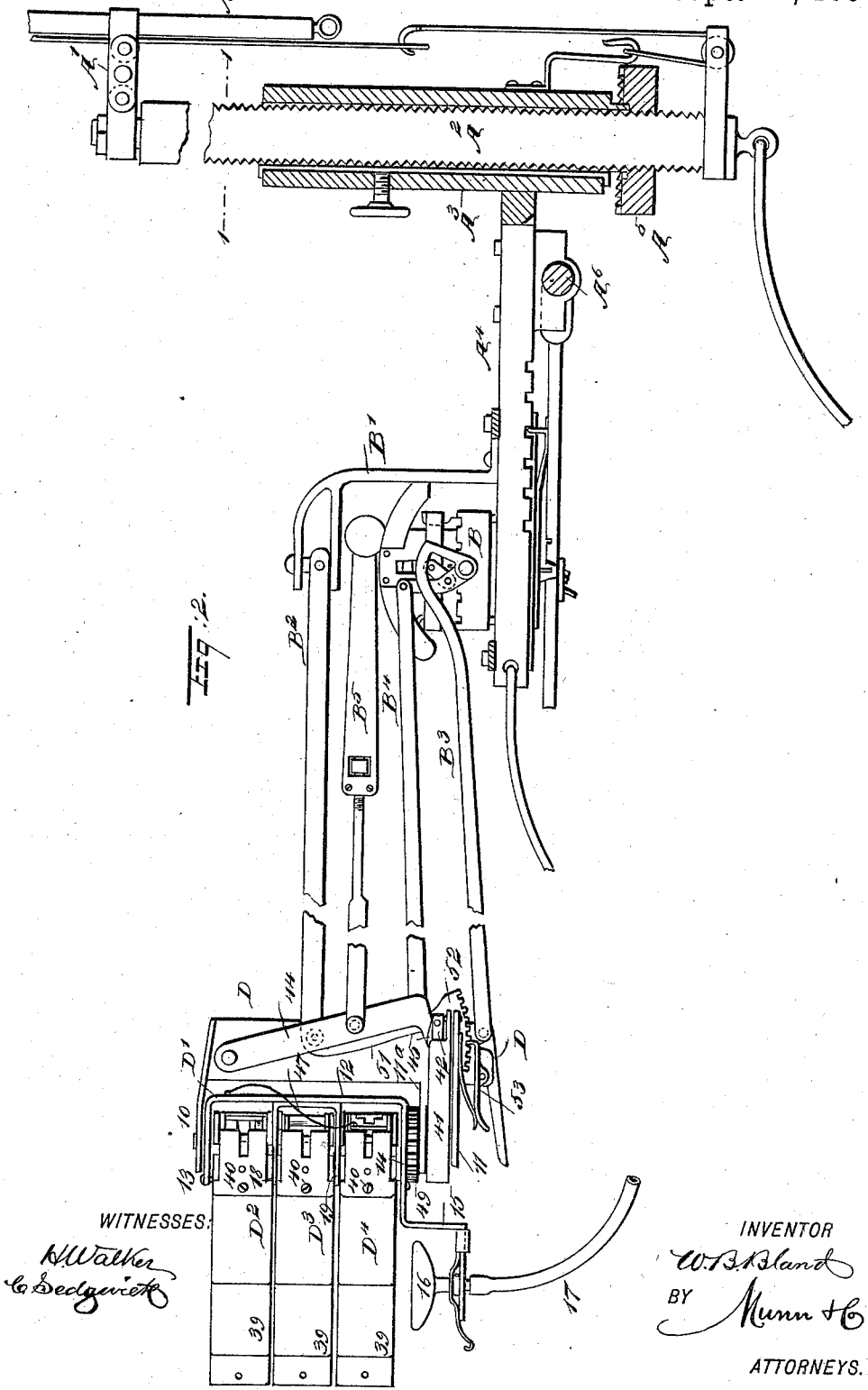

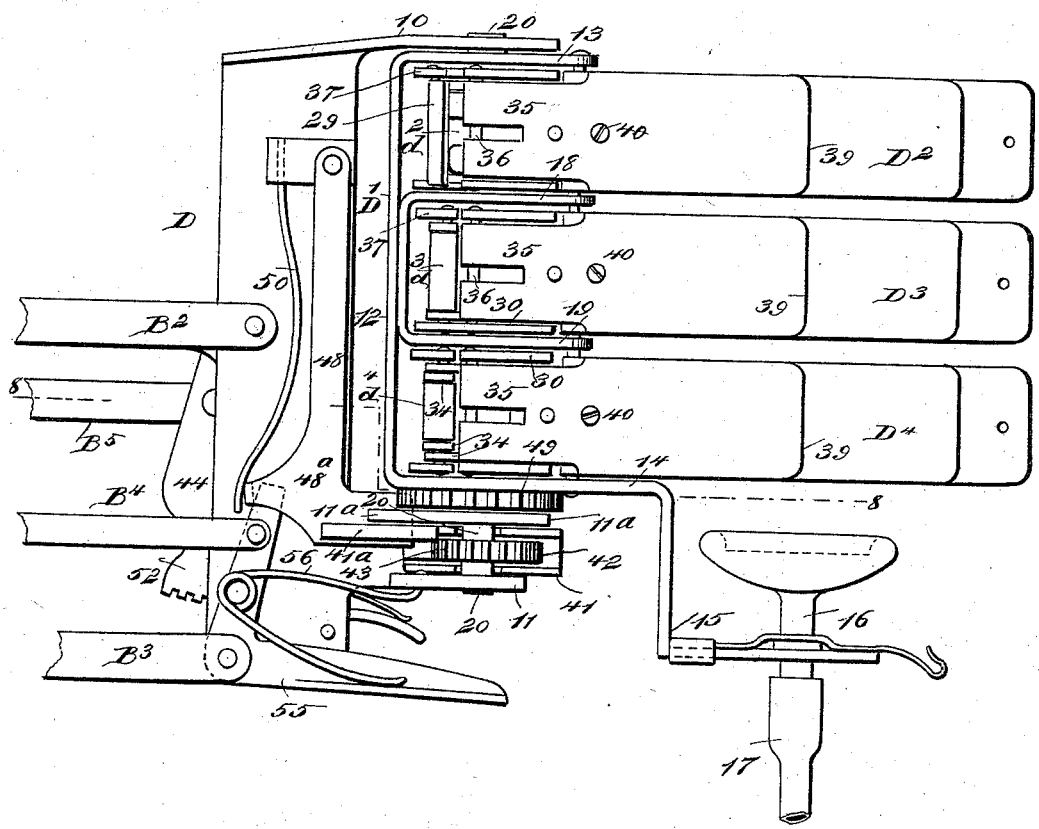
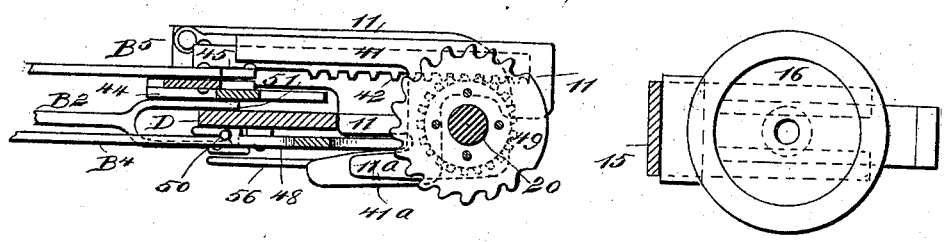

United States Patent Office.

WILLIAM BURDINE BLAND, OF MAQUON, ILLINOIS.

COW-MILKING MACHINE.

SPECIFICATION forming part of Letters Patent No. 526,215, dated September 18, 1894.

Application filed April 24, 1894. Serial No. 508,785. (No model.)

*To all whom it may concern:*

Be it known that I, WILLIAM BURDINE BLAND, of Maquon, in the county of Knox and State of Illinois, have invented a new and Improved Cow-Milking Machine, of which the following is a full, clear, and exact description.

My invention relates to an improvement in cow-milking machines, and has for its object to improve upon the construction of the machine for which Letters Patent were granted to myself January 16, 1894, No. 512,939, the improvement relating directly to the simplification of the construction and improvement in the action of the milking fingers, their direct actuating mechanism, and means for adjusting the fingers and their carrying frame to different positions, the motive power, main frame and driving mechanism remaining the same as those shown and described in the said Letters Patent.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the improved cow-milking machine, a portion of the support being in section, said section being taken on the line 1—1 of Fig. 2. Fig. 2 is a side elevation of the main portion of the machine, its support and main frame being in vertical section, said section being taken on the line 2—2 of Fig. 1. Fig. 3 is an enlarged view of one side of the milking fingers and their carrying frame. Fig. 4 is a similar view of the opposite side of the said fingers and their frame. Fig. 5 is a horizontal section taken practically on the line 5—5 of Fig. 4. Fig. 6 is a horizontal section on the line 6—6 of Fig. 4. Fig. 7 is a horizontal section on the line 7—7 of Fig. 4; and Fig. 8 is a section taken horizontally through the supporting frame of the fingers, practically on the line 8—8 of Fig. 3.

That portion of the machine shown and described in the aforesaid patent, and which is illustrated in the present application may be briefly described as follows: The machine is adapted to be supported upon a cow by means of a harness, a portion of which consisting of a suspension bar A and coupling $A'$ is illustrated in Fig. 2. The coupling supports a bar $A^2$ having two flat and two opposing surfaces, a sleeve $A^3$, having sliding movement upon the bar, and a horizontal main frame $A^4$, secured to the sleeve, and a nut $A^5$, located upon the bar and engaging with the lower end of the sleeve. The frame carries a drive shaft $A^6$, operated by hand or other power, and a dog $A^7$, shown best in Fig. 1, operated from the drive shaft, is placed in position to turn the nut $A^5$ in a direction to gradually elevate the frame $A^4$, proportionately to the shrinkage of the udder to which the machine has been adjusted. The main frame has adjustably mounted upon it one or more carriages B, each containing driving mechanism of the same type of construction and driven simultaneously from the driving shaft $A^6$, each carriage being provided with means for disconnecting its driving mechanism from the drive shaft, and a bracket $B'$, extending in a forwardly direction over the driving mechanism, as shown in Figs. 1 and 2. The bracket $B'$ of each carriage is pivotally or universally connected near one end with a forwardly extending supporting arm $B^2$, pivotally connected with the main or carrying frame D of the finger mechanism to be hereinafter described. A second supporting arm $B^3$ is pivotally connected with each carriage and with the lower rear portion of the said finger frame D, the two arms serving to maintain the finger carrying frame in substantially a horizontal position, and when the said frame is raised or lowered the two arms $B^2$ and $B^3$, move simultaneously and in parallel lines. The devices employed in each carriage for throwing its contained driving mechanism out of gear with the drive shaft, are each operated by a shifting link $B^4$, connected with such mechanism, as shown in Fig. 1, said links being likewise connected with shifting levers located upon the improved finger carrying frame and to be hereinafter designated. Finally, the same character of actuating shaft $B^5$, is employed as is shown in the former patent, to communicate motion from the driving mechanisms of each carriage to the actuating mechanism of the fingers in connection with said carriage, the said actuating shafts B⁵ having a universal connection with the driving mechanism contained in the carriages.

The main frame D of the improved milking fingers consists of a perpendicular body section, which may be quite thin, a top member 10, extending forwardly and horizontally from the body, and two spaced bottom members 11 and 11ᵃ, extending in the same direction, the member 11ᵃ being the upper one. The main frame D, is adapted to carry the finger frame proper D', and this latter frame is located between the upper member 10 of the main frame and the intermediate member 11ᵃ. The frame D' consists of a vertical body section 12, a forwardly-extending lower horizontal member 14, which is provided with an angular extension or bracket 15 adapted to be located immediately beneath the milking fingers and this bracket is further adapted to hold in position to receive the milk, a strainer 16, which is usually connected with the receptacle adapted to receive the milk by means of a flexible section of hose 17. The finger frame D', is preferably provided with two horizontal projections 18 and 19, located one at each side of the center, which projections may be made integral, as shown in Figs. 3 and 4, if desired. In this manner the finger frame D', is divided practically into three compartments, an upper, a lower and an intermediate one, and the finger frame is pivoted in the main frame by passing a shaft 20, through the horizontal members of both frames, the shaft being free to turn in both of said frames. A set of fingers, two opposing fingers constituting a set, is pivoted at its inner end in each compartment of the finger frame, and the sets of compartments are designated, commencing at the top, by the reference letters D², D³ and D⁴. The actuating mechanism for the fingers is as follows: A crank is located in each compartment of the finger frame, being loosely mounted on the shaft 20, the crank in the upper compartment being designated as $d^2$, the crank in the intermediate compartment as $d^3$, and the crank in the lower compartment as $d^4$, corresponding in letters and numerals to the fingers they are adapted to actuate. Each crank consists of a sleeve 21, loosely mounted upon the shaft 20, and a top and bottom plate 22, extending beyond opposite sides of the sleeve, said plates being preferably somewhat diamond shaped; and they are connected at their ends by posts 23, which are usually provided with suitable spacing sleeves 24. The sleeve of the crank $d^2$, is provided with a horizontally formed slot 25, extending nearly around the same, as shown in Fig. 5. The sleeve in the next crank $d^3$, is provided with a much smaller slot 26, of the same character, as shown in Fig. 6, while the sleeve of the lower crank $D^4$, is provided with a slot 27, which is preferably larger than the slot 26 but not as long as the slot 25. The shaft 20, is provided with pins 28, extending at right angles from its sides, one of the pins being adapted to enter and turn loosely in the slot of the sleeve of each crank.

In connection with the upper crank $d^2$ a dog 29 is employed, which is in the nature of a curved plate, and is provided with an opening 30 to receive the upper stud 28 on the shaft 20, as shown in Fig. 5, the said plate-dog having bearings upon one of the posts 23 connecting the plates of the upper crank, and the dog has secured to it a spring 31, which is carried around the crank $d^2$ and held in such manner that the dog is normally pressed thereby in engagement with the sleeve of that crank and the aforesaid stud. A similar dog 32, is used in connection with the lower crank $d^4$. This dog is provided with a much longer opening 33, receiving the lower pin 28 on the shaft 20, as shown in Fig. 7. This dog is not spring pressed, but is pivoted upon one of the posts 23 of that crank. At the forward end of the mouth of each compartment in the finger frame, two studs 34, are located, the said studs constituting pivots upon which angular arms 35, are held to turn. These arms comprise two members, the inner member at its forward end being pivoted upon one of the studs 34, while the outer member at its forward end diverges from the pivot stud. These members are preferably slightly curved in an inwardly and rearwardly direction. They extend rearwardly, and at their rear or converging ends a knuckle is formed in which a pivot pin 36, is located. The pivot pin 36 of one of the angular arms 35, is connected at top and bottom by links 37, preferably forwardly and outwardly curved, with one of the studs connecting the plates of the cranks, while the opposing angular arm has its pivot 36 connected with the opposite stud of the crank in connection with which it is used, this latter link being curved in opposite directions to the former one. Each crank is fitted up in this manner, and the angular arms constitute the body portions of the framing for the milking fingers, the grasping sections or portions of said fingers being in the nature of leaf springs, the leaves of the fingers of a set being curved outwardly or in opposite directions, whereby an oval space is formed between them. These leaves are designated as 39 in the drawings, and the inner one, which is the longer, is secured to the forward end of the inner member of each body section or angular arm 35, the attachment being at the pivot point of said arms, while the other leaves are carried rearward between the members of the body, or arms 35, and secured by means of rivets or other equivalent fastening devices. More or less tension is applied to the inner leaves of the fingers by means of set screws 40 located in the outer ends of the outer members of the body portions of the fingers and having bearing against the outer leaves. Each finger is usually provided with an aperture whereby a glove may be secured upon it to prevent the metal coming in contact with a teat; but owing to the leaf-like construction of the fingers they will not injure the surface with which they come in contact, and closely approximate in their action that of the fingers of the human hand.

In the action of the fingers in closing, the upper fingers are closed first, next the intermediate set, and finally the third or last set. This is accomplished in the following manner: The shaft 20 is given a rotary reciprocating movement, and when the shaft is turned to the right the upper pin 28 on the shaft will bear against the outer wall of the opening 30 in the upper plate-dog 29, thereby forcing that dog against the outer post 23 of the upper crank and causing the post to move in direction of the opposite side, turning the crank. This movement of the crank will force outward, through the medium of the links 37 and 38 the rear of the body portion of each finger of the upper set, and will cause said fingers to closely approach one another and grasp whatever object may be placed between them. This is accomplished by reason of the unhinged end of the curved plate-dog 29 coming in contact with the curved arm 22, and while the shaft 20 is being revolved to the right, the plate dog 29 is forced away from the sleeve 21, thereby freeing the pin 28, and permitting the shaft 20 to turn independent of the crank $d^2$. The action of the plate dog 29 operating the upper set of fingers must be retarded in order that the dog operating the lower set of fingers may act some time after the upper dog 29, the upper fingers remaining meanwhile closed. This is accomplished by locating upon the upper plate 22 of the upper crank $d^2$ a check pin $22^a$ as shown in Fig. 5, which pin acts to prevent the crank $d^2$ from revolving after the pin 28 is released by the dog 29, through the medium of the arm 38, hinged to the said plate 22 with the same rivet employed to hinge the dog 29 to said plate 22, coming in contact with the check pin. When the parts are in this position the top pair of fingers remain closed independently of the shaft 20. About as soon as this action has been accomplished the second pin will have engaged with one of the walls in the slot of the sleeve on the second crank, and will have revolved said crank in a like direction as the upper one, whereupon the same action will take place with reference to the second set of fingers, and immediately after, the lower pin will act upon the lower dog 32 and close the lower fingers. Upon the reverse motion of the shaft the fingers will be opened.

The shaft receives its rotary reciprocating movement from the drive or actuating shaft $B^5$, and in the following manner: Upon what may be termed the right-hand side of the finger frame, or that shown in Fig. 4, a horizontal boxing or casing 41, is pivoted at its rear end upon the lower flange or member 11 of the main frame D, and this boxing or casing, as shown in dotted lines in Fig. 8, is provided with a hook-like member $41^a$, which extends in the direction of the opposite side of the rear of the shaft 20, and is substantially parallel with the opposite side of the frame; and one edge of the hook-like extension $41^a$ is more or less beveled. A rack 42, is held to slide in the casing or boxing 41, and to engage with a pinion 43 upon the shaft 20 between the members 11 and $11^a$ of the main frame. The rack is connected with the lower end of a lever 44, shown likewise in Fig. 4, through the medium of a short link 45, the lower end of the lever 44 being more or less forwardly curved; and the said lever, at a point preferably between its center and lower end, is pivotally connected with the said actuating shaft $B^5$. It may here be remarked that sometimes but two fingers are necessary in milking a teat, especially when the latter is short, and in that event the third and lower finger may be thrown out of action by manipulating a cord 47, attached preferably to the finger frame D' and to the dog 32 of the lower finger crank. The rack 42, is held up to an engagement with the pinion 43 through the medium of a lock lever 48, preferably of substantially L-shaped construction, fulcrumed at its upper end upon the left-hand side of the main frame D, as shown in Fig. 3, the horizontal member of the lever being made to engage with the inclined wall of the hook extension $41^a$ of the rack casing, and as this casing is constructed of a spring material, when the lock lever is disengaged from the hook extension $41^a$ of the casing, the said casing will spring outward in direction of the right-hand side of the main frame and thus carry the rack out of engagement with the pinion. The lock lever 48 has another function namely,—that of maintaining the finger-carrying frame D' in whatever lateral position it may be placed, as it often happens that the fingers need to be adjusted laterally to accommodate themselves properly to the teats of an udder. This is accomplished by locating a ratchet wheel 49, or the equivalent thereof, upon the lower portion of the finger frame, or upon the member 14 thereof and around the opening through which the shaft passes. The lever near its lower end is usually provided with a rearward or hook-like extension $48^a$ on its vertical member, and the said extension or other rear portion of the lever, is constantly pressed in a forward direction by a spring 50, likewise shown in Fig. 3, whereby the said lever is constantly in locked position unless purposely disengaged. Thus it will be observed that by carrying the lock lever 48 out of engagement with the ratchet wheel 49 the fingers and the frame carrying them may be turned upon the shaft 20 to any desired lateral position, and held in that position when the lock lever is again in engagement with the ratchet wheel; and that when the lock lever is carried out of engagement with both the ratchet wheel 49 and the hook extension $41^a$ of the rack casing, the driving connection between the actuating shaft B⁵ and the finger shaft 20 will be broken. It may here be remarked that the upper supporting arm B² heretofore referred to is pivotally connected with the vertical or body member of the main finger frame D, as is shown in Fig. 4, at or near the center of said frame; and said arm B² at its forward end is provided with a downwardly-extending branch 51, which terminates at its lower end in a toothed segment or segmental rack 52; and the desired vertical inclination of the finger frame and main carrying frame D is obtained primarily through the medium of this rack and through the medium of a spring-controlled latch 53, which is fulcrumed upon an extension of the main frame D at the bottom thereof, as is likewise shown in Fig. 4. By disengaging the latch 53 from the segmental rack 52, the finger frame may be carried upward or downward with relation to the main or supporting frame A⁴ of the machine and with reference to its carriage, and held in that position by causing the latch to engage with the rack.

The lower supporting rod or arm B³ is pivotally connected with the extreme rear lower portion of the main frame D, as shown in Fig. 3, and when that frame is adjusted the lower arm B³ and the upper arm B² move in parallel lines; and the rearward end of the lower arm B³ is bifurcated and rendered somewhat hook shaped in order that it may better connect with the actuating mechanism of the carriage to which the fingers belong without interfering with other mechanism.

With reference to the link B⁴ heretofore referred to, said link is adapted especially as a shifting device, and is connected with the upper end of an angular lever 55, which lever is usually fulcrumed upon the left-hand side of the main frame D at the bottom thereof and the upper end of the member with which the link B⁴ is held in constant bearing against the projection 48ª of the lock lever 48; but the tendency of the said member is to move in a forwardly direction, since a spring 56, exerts constant downward pressure upon its horizontal member. The shifting link B⁴, is connected with a shifting mechanism forming no portion of this invention and heretofore referred to, located in one of the carriages B; and supposing that one person is attending to the fingers while another is turning the crank of the drive shaft, and it is desired to stop the action of the fingers and likewise the movement of the actuating mechanism in the carriage, the person near the fingers by simply pressing upward upon the horizontal member of the shifting lever 55, will throw the lock lever 48 out of engagement with the rack casing 41, and will also at the same time force the link B⁴ rearward, which action will bring into play the shifting mechanism connected with the actuating mechanism in the carriage B to effect a disconnection between said actuating mechanism and the drive shaft A⁶.

Having thus described my invention, I claim as new and desire to secure by Letters Patent—

1. In a cow-milking machine, milking fingers constructed of over-lapping leaves, as and for the purpose specified.

2. In a cow-milking machine, milking fingers the same consisting of a series of spring leaves, and being provided with a tension device whereby their yielding capacity may be regulated, as and for the purpose specified.

3. In a cow-milking machine, milking fingers, the same consisting of an angular body adapted to be pivoted at the forward end of the inner member, and a gripping section comprising series of spring leaves, the inner and the longer of which is attached to the pivoted member of the body, the outer leaves being introduced and secured between the members of the body, and an adjusting device carried by one of the members of the body and having bearing against the outer leaves, as and for the purpose specified.

4. In a cow-milking machine, a series of spring fingers provided with angular bodies adapted to be pivotally attached to and supported at the forward ends of their inner members, a shaft capable of a reciprocating motion, a crank actuated by the said shaft and links connected with opposite ends of the crank and with the inner ends of the body portions of opposing fingers, as and for the purpose set forth.

5. In a cow-milking machine, the combination, with a main frame, a shaft held to revolve in said frame, a finger-carrying frame mounted to turn upon said shaft, and locking devices controlling the movement of the finger-carrying frame, of a series of spring fingers arranged in sets, one set above the other, each set of fingers comprising clamping sections and body sections, the body sections being pivoted at their forward ends in supports within the carrying frame, cranks loosely mounted upon the shaft and carrying apertured sleeves, pins projected from the shaft through the apertures in the sleeves, links connecting opposite ends with the inner or rear ends of the body portions of opposing fingers, and dogs operated by sundry of the shaft pins and adapted for engagement with sundry of the cranks, the said dogs serving to impart to the fingers timed movement relative to one another, as and for the purpose specified.

6. In a cow-milking machine, the combination, with a main frame, a shaft held to revolve in said frame, a finger-carrying frame mounted to turn upon said shaft, and locking devices controlling the movement of the finger-carrying frame, of a series of spring fingers arranged in sets, one set above the other, each set of fingers comprising clamping sections and body sections, the body sections being pivoted at their forward ends in supports within the carrying frame, cranks loosely mounted upon the shaft and carrying apertured sleeves, pins projected from the shaft through the apertures in the sleeves, links connecting opposite ends with the inner or rear ends of the body portions of opposing fingers, dogs operated by sundry of the shaft pins and adapted for engagement with sundry of the cranks, the said dogs serving to impart to the fingers timed movement relative to one another, means, substantially as shown and described, for removing one of the dogs from the action of the shaft, and an adjusting mechanism, substantially as specified, whereby the main frame may be vertically adjusted, as and for the purpose set forth.

7. In a cow milking machine, the combination, with a drive shaft, a driving mechanism connected with said shaft, and an actuating shaft driven by said driving mechanism, of a frame provided with a series of spring fingers arranged in sets, and an actuating mechanism carried by said frame, operating to open and close the fingers, substantially as described, the main shaft of the said actuating mechanism being provided with a pinion, a rack carried by a movable casing engaging with the said pinion, a connection between the actuating shaft and the said rack, whereby the latter is reciprocated, and a lock lever adapted to hold the rack in engagement with the pinion, or release the same from such engagement, as and for the purpose set forth.

8. In a cow-milking machine, the combination, with a base frame, a driving shaft connected therewith, driving mechanism carried by the said frame and actuated from the said shaft and supporting arms pivotally connected with the base frame, said supporting arms being adapted to have parallel movement, of an auxiliary frame having pivotal connection with the said supporting arms, milking fingers carried by the said auxiliary frame, and a means substantially as shown and described, for operating said fingers, an arm projected downward from the upper support at one side of the auxiliary frame, terminating at its lower end in a rack, and a latch carried by the auxiliary frame, engaging with the said rack, whereby the auxiliary frame may be given vertical adjustment, substantially as shown and described.

WILLIAM BURDINE BLAND.

Witnesses:
   A. L. DENISON,
   F. E. BLAND.